No. 669,344. Patented Mar. 5, 1901.
E. L. MOORE.
WAGON BRAKE.
(Application filed Nov. 22, 1900.)
(No Model.) 2 Sheets—Sheet 2.
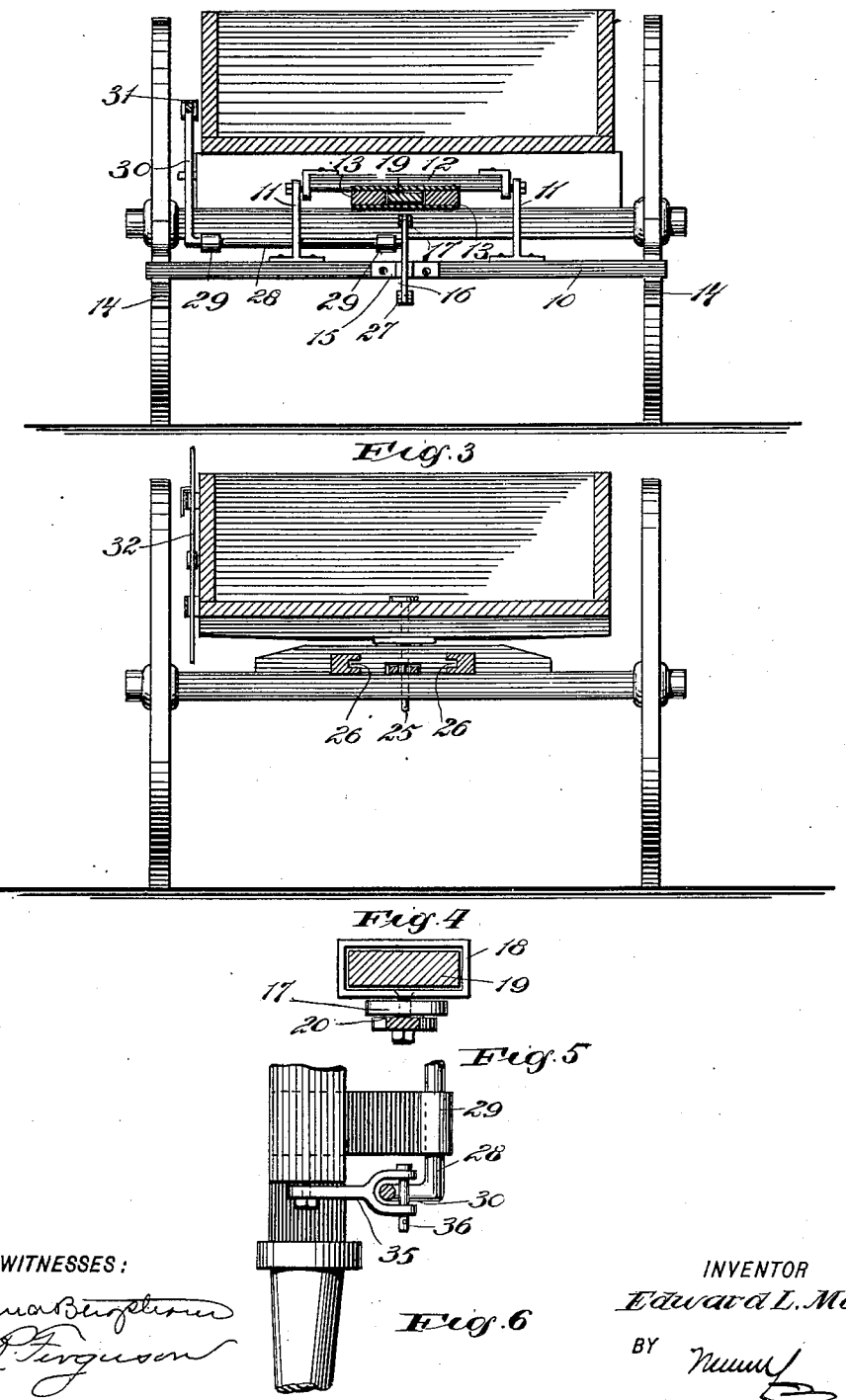
WITNESSES:
INVENTOR
Edward L. Moore
BY
ATTORNEYS
THE NORRIS PETERS CO., PHOTO-LITHO., WASHINGTON, D. C.

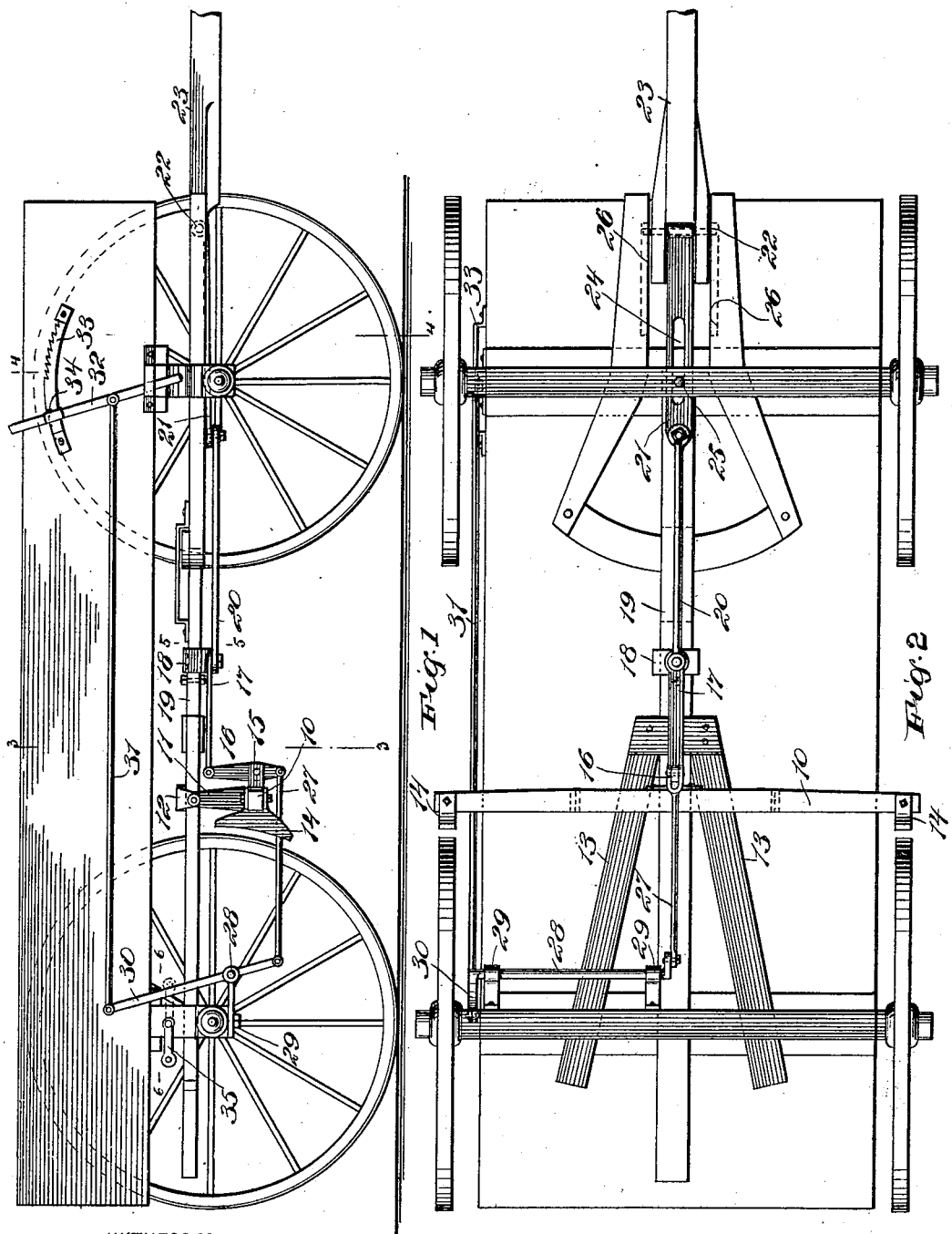

UNITED STATES PATENT OFFICE.

EDWARD L. MOORE, OF SUNDANCE, WYOMING, ASSIGNOR OF ONE-HALF TO WILLIAM B. OGDEN AND SUSAN H. CARLILE-KENT, OF SAME PLACE.

WAGON-BRAKE.

SPECIFICATION forming part of Letters Patent No. 669,344, dated March 5, 1901.

Application filed November 22, 1900. Serial No. 37,329. (No model.)

*To all whom it may concern:*

Be it known that I, EDWARD L. MOORE, a citizen of the United States, and a resident of Sundance, in the county of Crook and State of Wyoming, have invented a new and Improved Wagon-Brake, of which the following is a full, clear, and exact description.

This invention relates to improvements in brakes for wagons; and the objects are to provide a brake of simple construction that may be readily applied to any wagon and will act automatically while traveling downgrades, the pressure of the brake on the wheels being regulated to a greater or less degree by the degree of inclination and the load-weight, and, further, to provide a simple means for preventing the brake from braking action when it is desired to back the vehicle.

I will describe a wagon-brake embodying my invention and then point out the novel features in the appended claims.

Reference is to be had to the accompanying drawings, forming a part of this specification, in which similar characters of reference indicate corresponding parts in all the figures.

Figure 1 is a side elevation of a wagon and brake mechanism embodying my invention. Fig. 2 is a bottom plan view. Fig. 3 is a section on the line 3 3 of Fig. 1. Fig. 4 is a section on the line 4 4 of Fig. 1. Fig. 5 is a section on the line 5 5 of Fig. 1, and Fig. 6 is a section on the line 6 6 of Fig. 1.

Referring to the drawings, 10 designates the brake-beam, supported by hangers 11, pivotally connected to a cross-bar 12, attached to the upper side of the rear braces 13. On the ends of the brake-beam are brake-shoes 14, and extended forward from the center of the beam is a plate 15, to which a lever 16 is pivotally attached between its ends. From the upper end of the lever 16 a link 17 extends to a connection with a sleeve 18, mounted to move longitudinally on the reach 19. From the sleeve 18 a push-rod 20 extends and connects pivotally at its forward end with a push-plate 21, which at its forward end has connection with a bolt or bar 22, extended transversely through the pole 23. The plate 21 is provided with a slot 24, through which the king-bolt 25 passes. The ends of the bolt or bar 22 extend into slots 26, formed longitudinally on the inner sides of the front sections of the hounds.

In operation while the vehicle is moving down a hill it will be moved forward relatively to the tongue as the ends of the bolt 22 may move in the slots 26. This of course will throw the thrust of the pole upon the horses, which by holding back slightly will prevent a forward movement of the pole relatively to the vehicle. This movement of the vehicle relatively to the pole will swing the brake-shoes into engagement with the rear wheels, and, as before stated, the degree of pressure of the shoes upon the wheels will be regulated by the weight of the load and the grade of the hill.

I provide means for operating the brake manually when so desired. This means consists of a link 27, extended from the lower end of the lever 16 to a connection with the crank end of a rock-shaft 28, mounted to rock in bearings 29, attached to the rear axle. On the outer end of the rock-shaft 28 is an upwardly-extended arm 30, from which a draw-rod 31 extends to a connection with a hand-lever 32, mounted to swing on the body of the vehicle and having a spring-dog adapted to engage in any one of a series of notches formed in a rack-bar 33, attached to the wagon-body.

The brake may be locked or prevented from moving to a braking position by moving the hand-lever back until its dog engages in the rear notch 34. When it is desired, however, to operate the brake automatically, as first described, the hand-lever must be left locked at the middle of the rack, and obviously the brake may be set by hand by moving the hand-lever forward and engaging its dog in a notch of the rack-bar.

When a body is not used on the vehicle, the arm 30 may be held by means of a loop 35, pivoted to the end of the rear bolster and adapted to engage its bifurcated end with the arm 30, the ends being provided with openings through which the fastening-bolt 36 may be passed to engage against the front of said arm.

Having thus described my invention, I claim as new and desire to secure by Letters Patent—

1. A vehicle-brake, comprising a brake-bar mounted to swing, shoes on said bar, a lever pivoted to the forward side of said brake-bar, a sleeve mounted to slide longitudinally of the vehicle-reach, a link connection between said lever and the sleeve, a pole having sliding connection with the vehicle-hounds, a plate extended from said pole and having an opening through which the king-bolt of the vehicle passes, and a rod connection between said plate and the sliding sleeve, substantially as specified.

2. A vehicle-brake, comprising a swinging brake-bar, shoes on said brake-bar, a lever pivoted to the front side of said bar, a pole having sliding connection with the vehicle-hounds, a connection between said pole and the upper end of said lever, a rock-shaft rearward of the brake-bar, a link connection between the lower end of said lever and a crank on the rock-shaft, an arm extended upward from the outer end of said rock-shaft, a hand-lever forward of the brake-bar, and a draw-rod connection between said arm and the hand-lever, substantially as specified.

3. A vehicle-brake, comprising a swinging brake-bar, shoes on said bar, a lever pivoted to the front side of said bar, a pole having sliding connection with the vehicle-hounds, a connection between said pole and the upper end of said lever, a rock-shaft, a link connection between a crank on said rock-shaft and the lower end of said lever, an arm extended upward from said rock-shaft, and a loop pivoted on the vehicle for engaging the said arm to hold the brake in an inoperative position, substantially as specified.

In testimony whereof I have signed my name to this specification in the presence of two subscribing witnesses.

EDWARD L. MOORE.

Witnesses:
MELVIN NICHOLS,
A. E. HOYT.